(12) United States Patent
Krishnaswamy et al.

(10) Patent No.: US 11,599,625 B2
(45) Date of Patent: Mar. 7, 2023

(54) TECHNIQUES FOR INSTRUCTION PERTURBATION FOR IMPROVED DEVICE SECURITY

(71) Applicant: QUALCOMM Incorporated, San Diego, CA (US)

(72) Inventors: Arvind Krishnaswamy, San Jose, CA (US); Suresh Kumar Venkumahanti, Austin, TX (US); Charles Tabony, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/160,769

(22) Filed: Jan. 28, 2021

(65) Prior Publication Data

US 2022/0237283 A1 Jul. 28, 2022

(51) Int. Cl.
G06F 21/00 (2013.01)
G06F 21/52 (2013.01)
G06F 9/38 (2018.01)
H04L 49/00 (2022.01)

(52) U.S. Cl.
CPC ............ *G06F 21/52* (2013.01); *G06F 9/3855* (2013.01); *G06F 2221/033* (2013.01); *H04L 49/3063* (2013.01)

(58) Field of Classification Search
CPC .. G06F 21/52; G06F 9/3855; G06F 2221/033; G06F 21/54; G06F 21/14; H04L 49/3063
See application file for complete search history.

(56) References Cited

U.S. PATENT DOCUMENTS

| | | | | |
|---|---|---|---|---|
| 5,983,336 | A * | 11/1999 | Sakhin | G06F 9/3814 |
| | | | | 712/E9.046 |
| 10,657,262 | B1 * | 5/2020 | Cui | G06F 21/54 |
| 2015/0220347 | A1 * | 8/2015 | Glossner | G06F 9/3885 |
| | | | | 712/215 |
| 2020/0089502 | A1 * | 3/2020 | Hong | G06F 9/3836 |
| 2022/0113960 | A1 * | 4/2022 | Moran | G06F 8/658 |

FOREIGN PATENT DOCUMENTS

| | | |
|---|---|---|
| EP | 3033706 B1 | 10/2019 |
| WO | WO-2017106103 A1 | 6/2017 |

OTHER PUBLICATIONS

International Search Report and Written Opinion—PCT/US2021/061207—ISA/EPO—dated Mar. 3, 2022.

* cited by examiner

*Primary Examiner* — Ghazal B Shehni
(74) *Attorney, Agent, or Firm* — Holland & Hart LLP (57) ABSTRACT

Methods, systems, and devices for techniques for instruction perturbation for improved device security are described. A device may assign a set of executable instructions to an instruction packet based on a parameter associated with the instruction packet, and each executable instruction of the set of executable instructions may be independent from other executable instructions of the set of executable instructions. The device may select an order of the set of executable instructions based on a slot instruction rule associated with the device, and each executable instruction of the set of executable instructions may correspond to a respective slot associated with memory of the device. The device may modify the order of the set of executable instructions in a memory hierarchy post pre-decode based on the slot instruction rule and process the set of executable instructions of the instruction packet based on the modified order.

20 Claims, 7 Drawing Sheets

TECHNIQUES FOR INSTRUCTION PERTURBATION FOR IMPROVED DEVICE SECURITY

BACKGROUND

The following relates to instruction processing, including techniques for instruction perturbation for improved device security.

Some systems may be widely deployed to provide various types of content such as voice, video, packet data, messaging, broadcast, and so on. These systems may be capable of processing, storage, generation, manipulation and rendition of information. Examples of such systems may include entertainment systems, information systems, virtual reality systems, model and simulation systems, and so on. These systems may employ a combination of hardware and software technologies to support processing, storage, generation, manipulation and rendition of information, for example, such as capture devices, storage devices, communication networks, computer systems, and display devices. A system may include one or more devices that process executable instructions. For example, some systems may include very long instruction word (VLIW) processors supportive of a computer processing architecture in which a language compiler may divide instructions into basic operations that can be performed in parallel.

SUMMARY

The described techniques relate to improved methods, systems, devices, and apparatuses that support techniques for instruction perturbation for improved device security. Generally, the described techniques provide for perturbing (e.g., modifying, shuffling, randomizing, etc.) executable instructions. For example, a device may identify a set of executable instructions corresponding to a first order (e.g., a first executable instruction to virtual memory address mapping), perturb the executable instructions in a random or pseudo random fashion such that the perturbed executable instructions correspond to a second order (e.g., a second executable instruction to virtual memory address mapping), and process the executable instructions based on the second order.

A device processor may process (e.g., execute) the executable instructions, and the processor may be considered or include aspects of a central processing unit (CPU), a graphics processing unit (GPU), a digital signal processor (DSP), a very long instruction word (VLIW) processor, or the like. The processors described above are examples, and aspects of the device processor described herein are not limited thereto. A compiler associated with the device may generate an instruction packet that contains a set of executable instructions, and the processor associated with the device may process the set of executable instructions according to a modified order.

For example, the device may assign a set of executable instructions to an instruction packet based on a parameter associated with the instruction packet. Each executable instruction of the set may be independent from other executable instructions of the set. The parameter may correspond to a packet size that is supported by the device. The device may select an order of the set of executable instructions based on a slot instruction rule associated with the device, and each executable instruction of the set may correspond to a respective slot associated with memory of the device. In some cases, the slot instruction rule may indicate the types of instructions that are supported by different slots. The device may modify the order of the set of executable instructions in a memory hierarchy post pre-decode based on the slot instruction rule and process the set of executable instructions based on the modified order.

A method is described. The method may include assigning a set of executable instructions to an instruction packet based on a parameter associated with the instruction packet, each executable instruction of the set of executable instructions independent from other executable instructions of the set of executable instructions, selecting an order of the set of executable instructions based on a slot instruction rule associated with the device, each executable instruction of the set of executable instructions corresponding to a respective slot associated with a memory of the device, modifying the order of the set of executable instructions in a memory hierarchy post pre-decode based on the slot instruction rule, and processing the set of executable instructions of the instruction packet based on the modified order.

An apparatus is described. The apparatus may include a processor, memory in electronic communication with the processor, and instructions stored in the memory. The instructions may be executable by the processor to cause the apparatus to assign a set of executable instructions to an instruction packet based on a parameter associated with the instruction packet, each executable instruction of the set of executable instructions independent from other executable instructions of the set of executable instructions, select an order of the set of executable instructions based on a slot instruction rule associated with the device, each executable instruction of the set of executable instructions corresponding to a respective slot associated with a memory of the device, modify the order of the set of executable instructions in a memory hierarchy post pre-decode based on the slot instruction rule, and process the set of executable instructions of the instruction packet based on the modified order.

Another apparatus is described. The apparatus may include means for assigning a set of executable instructions to an instruction packet based on a parameter associated with the instruction packet, each executable instruction of the set of executable instructions independent from other executable instructions of the set of executable instructions, means for selecting an order of the set of executable instructions based on a slot instruction rule associated with the device, each executable instruction of the set of executable instructions corresponding to a respective slot associated with a memory of the device, means for modifying the order of the set of executable instructions in a memory hierarchy post pre-decode based on the slot instruction rule, and means for processing the set of executable instructions of the instruction packet based on the modified order.

A non-transitory computer-readable medium storing code is described. The code may include instructions executable by a processor to assign a set of executable instructions to an instruction packet based on a parameter associated with the instruction packet, each executable instruction of the set of executable instructions independent from other executable instructions of the set of executable instructions, select an order of the set of executable instructions based on a slot instruction rule associated with the device, each executable instruction of the set of executable instructions corresponding to a respective slot associated with a memory of the device, modify the order of the set of executable instructions in a memory hierarchy post pre-decode based on the slot instruction rule, and process the set of executable instructions of the instruction packet based on the modified order.

Some examples of the method, apparatuses, and non-transitory computer-readable medium described herein may further include operations, features, means, or instructions for selecting a packet size of the instruction packet based on the set of executable instructions and assigning the set of executable instructions to the instructions packet based on the selected packet size of the instruction packet.

In some examples of the method, apparatuses, and non-transitory computer-readable medium described herein, modifying the order of the set of executable instructions may include operations, features, means, or instructions for selecting a first order of the set of executable instructions, determining, based on the first order of the set of executable instructions, that at least one executable instruction of the set of executable instructions violates the slot instruction rule, and in response to the at least one executable instruction of the set of executable instructions violating the slot instruction rule, refraining from processing the set of executable instructions of the instruction packet based on the first order.

Some examples of the method, apparatuses, and non-transitory computer-readable medium described herein may further include operations, features, means, or instructions for selecting a second order of the set of executable instructions based on determining that the at least one executable instruction of the set of executable instructions violates the slot instruction rule, determining based on the second order of the set of executable instructions, that each executable instruction of the set of executable instructions satisfies the slot instruction rule, and in response to each executable instruction of the set of executable instructions satisfying the slot instruction rule, processing the set of executable instructions of the instruction packet based on the second order.

Some examples of the method, apparatuses, and non-transitory computer-readable medium described herein may further include operations, features, means, or instructions for determining that each executable instruction of the set of executable instructions corresponds to a valid respective slot associated with the memory of the device and where selecting the order for the set of executable instructions may be based on determining that each executable instruction of the set of executable instructions corresponds to the valid respective slot associated with the memory of the device.

Some examples of the method, apparatuses, and non-transitory computer-readable medium described herein may further include operations, features, means, or instructions for receiving, from a first memory cache associated with the device, the set of executable instructions based on an initial order and transmitting, to a second memory cache associated with the device, the set of executable instructions based on the modified order.

Some examples of the method, apparatuses, and non-transitory computer-readable medium described herein may further include operations, features, means, or instructions for processing a subset of executable instructions of the set of executable instructions based on a randomization parameter.

Some examples of the method, apparatuses, and non-transitory computer-readable medium described herein may further include operations, features, means, or instructions for determining that the assigned random number associated with the stack frame may be modified and terminating the processing of the subset of executable instructions of the set of executable instructions based on the determining.

In some examples of the method, apparatuses, and non-transitory computer-readable medium described herein, processing the set of executable instructions may include operations, features, means, or instructions for executing the set of executable instructions on one or more processors associated with the device.

In some examples of the method, apparatuses, and non-transitory computer-readable medium described herein, the one or more processors include a variable length processor, a very long instruction word processor, or a Hexagon processor, or a combination thereof.

In some examples of the method, apparatuses, and non-transitory computer-readable medium described herein, the slot instruction rule includes an indication of one or more instruction types that may be supported by a slot.

In some examples of the method, apparatuses, and non-transitory computer-readable medium described herein, the parameter includes a packet size parameter identifying a packet size of the instruction packet.

In some examples of the method, apparatuses, and non-transitory computer-readable medium described herein, the set of executable instructions includes an absence of interlocked pipelined stages instructions.

In some examples of the method, apparatuses, and non-transitory computer-readable medium described herein, the set of executable instructions includes fewer executable instructions than a threshold number of executable instructions per instruction packet.

DETAILED DESCRIPTION

Various aspects of the present disclosure relate to techniques for perturbing (e.g., shuffling) executable instructions to eliminate or reduce a risk of device exploitations. For example, a user (e.g., a hacker, an attacker, a nefarious users, etc.) may exploit a device by altering the order of executable instruction processing (e.g., a code reuse attack), such that a desired device state is achieved as a result of processing the executable instructions according to the altered order. The user may determine actual or likely addresses (e.g., physical memory addresses or virtual memory addresses) for different executable instructions (e.g., code fragments) and manipulate the device (e.g., perform a buffer overflow) so that the device processes particular executable instructions that result in a desired device state.

A processor (e.g., a central processing unit (CPU), a graphics processing unit (GPU), a digital signal processor (DSP), a very long instruction word (VLIW) processor, etc.) may execute or otherwise perform instructions based on a modified order to thwart code reuse attacks and improve device security. A compiler associated with the device may generate an instruction packet that contains a set of executable instructions, and the executable instructions included in the instruction packet may be partially or fully independent from other executable instructions that are part of the instruction packet. The device may perturbate (e.g., shuffle) the set of executable instructions to create a new or modified order for the set of executable instructions, and the processor may execute the set of executable instructions according to the perturbated executable instructions. In some cases, the order of the executable instructions may be modified such that the updated order of the executable instructions satisfy a slot instruction rule. For example, some processors may specify or be associated with a slot instruction rule (e.g., a set of constraints) that, for example, describes which types of instructions may be assigned to one or more slots.

The techniques described herein may provide for more efficient implementation of dynamically indexed constants (e.g., in cases where large constant buffers exceed the capacity of local memory). Such techniques may reduce or eliminate the overhead latency, etc. associated with retrieving dynamically indexed constants from non-local memory (e.g., external memory), which may improve shader execution (e.g., improve run-time efficiency, reduce resource constraints) and/or performance (e.g., improve resource utilization, decrease system latency, reduce the number of constants retrieved from non-local memory, reduce parallel thread processing interruptions.

Aspects of the disclosure are initially described in the context of a system. Aspects of the disclosure are further illustrated by and described with reference to apparatus diagrams, system diagrams, and flowcharts that relate to techniques for instruction perturbation for improved device security.

Figure 1:
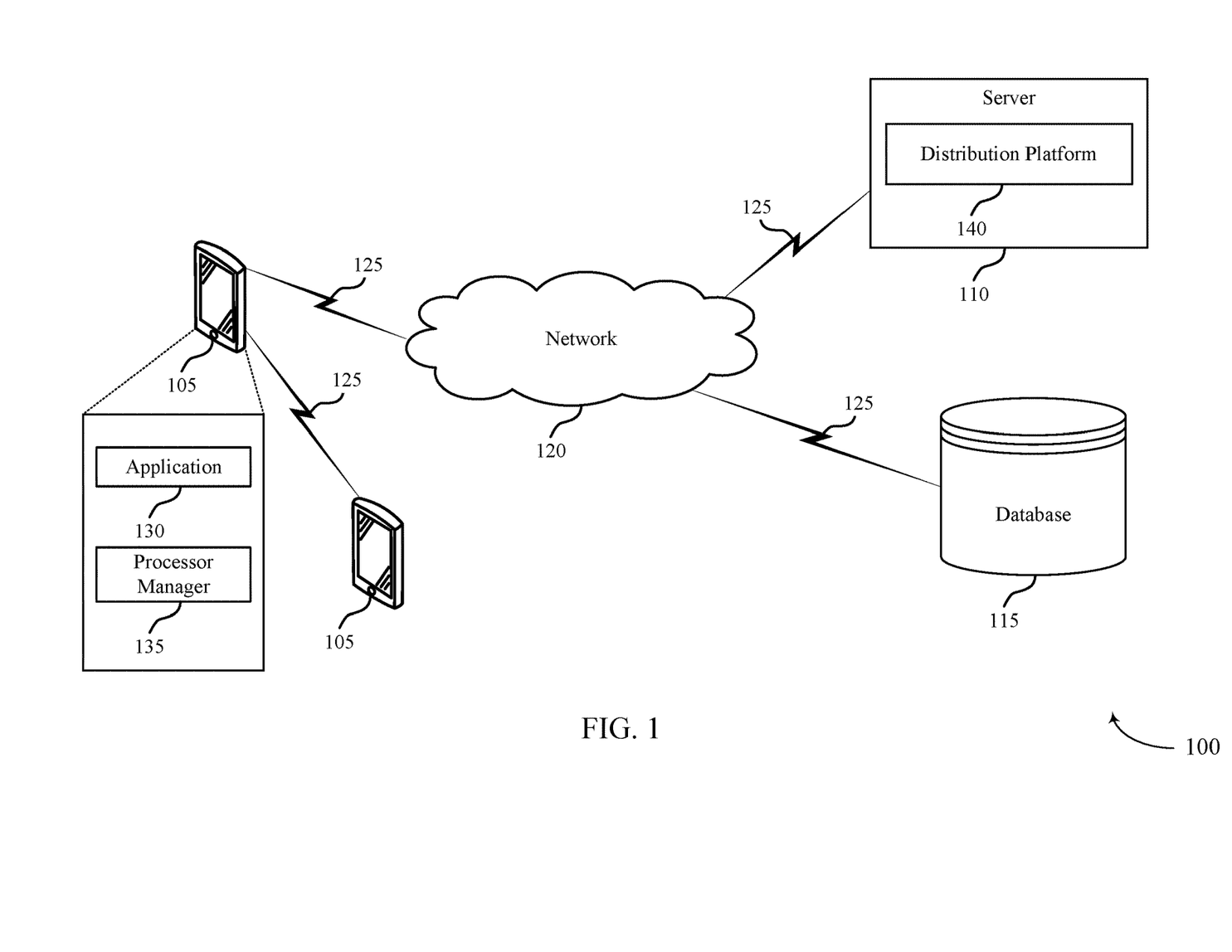
FIG. 1 illustrates an example of a system that supports techniques for instruction perturbation for improved device security in accordance with aspects of the present disclosure.

FIG. 1 illustrates a system 100 for a device that supports techniques for instruction perturbation in accordance with aspects of the present disclosure. The system 100 may include devices 105, a server 110, and a database 115. Although, the system 100 illustrates two devices 105, a single server 110, a single database 115, and a single network 120, the present disclosure applies to any system architecture having one or more devices 105, servers 110, databases 115, and networks 120. The devices 105, the server 110, and the database 115 may communicate with each other and exchange information that supports techniques for instruction perturbation for improved device security, such as packets, data, or control information, via network 120 using communications links 125. In some cases, a portion or all of the techniques described herein supporting techniques for instruction perturbation for improved device security may be performed by the devices 105 or the server 110, or both.

A device 105 implementing the processor manager 135 may executes instructions one instruction packet at a time. Each instruction packet may include multiple independent instructions and because there are no dependencies between each instruction, the instructions may be executed in parallel to achieve high performance for a processor of the device 105 as described herein. In some cases, a compiler associated with a processor of the device 105 may identify independent instructions and schedule the instructions into these instruction packets. For example, for a 4 wide instruction packet architecture, the compiler may schedule up to 4 independent instructions in each packet. Because the compiler may not be able to find 4 independent instructions for each cycle, the device 105 may support variable length packets, for example, 1 to 4 instructions wide. This allows for a compact representation of the code while also getting the performance from parallel execution.

By way of example, the device 105 may have an instruction packet denoted by 4 instructions as [A, B, C, D]. An example code gadget of 2 pops and a return may correspond to the sequence [B, C, D]. An attacker (e.g., another device 105) searching to reuse the code gadget has to be careful not to execute other instructions which may alter program state. This means the attacker (e.g., the other device 105) may have to jump to the address in the packet where B resides (or slot 2) and start executing. In other words, the attacker (e.g., the other device 105) has to jump into the middle of the instruction packet. Because all four instructions (e.g., [A, B, C, D]) are independent from each other, the device 105 (e.g., a processor of the device 105) may position each instructions in memory in any order and executed.

For example, instead of executing the instructions according to the following order [A, B, C, D], the device 105 (e.g., via a processor of the device 105) may transform the order to [B, A, D, C]. An attacker (e.g., the other device 105) would jump into the middle of the packet at slot 2 and start executing [A, D, C] which is not what the attacker (e.g., the other device 105) is expecting, and this would disrupt the malicious attack. That is, the attack is disrupted because the order of the existing instructions in a packet are now different from what the attacker is expecting. So when an attacker tries to execute an instruction at the virtual address corresponding to a slot 3 in a packet a different set of instructions will execute. The device 105 may be configured to perform such random perturbations at runtime picking a different order each time the sequence is executed making it hard for an attacker to know the exact location of individual code gadgets thereby thwarting the attack.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to data executable instructions (e.g., transmitting, receiving, broadcasting, streaming, sinking, capturing, storing, and recording data executable instructions). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands.

The devices 105 may include an application 130 and a processor manager 135. While, the system 100 illustrates the devices 105 including both the application 130 and the processor manager 135, the application 130 and the processor manager 135 may be an optional feature for the devices 105. In some cases, the application 130 may be an application that can receive (e.g., download, stream, broadcast) from the server 110, database 115 or another device 105, or transmit (e.g., upload) data to the server 110, the database 115, or to another device 105 via using communications links 125.

The processor manager 135 may be part of a general-purpose processor, a DSP, an image signal processor (ISP), a CPU, a GPU, a microcontroller, an application-specific integrated circuit (ASIC), a field-programmable gate array (FPGA), a discrete gate or transistor logic component, a discrete hardware component, a VLIW, or any combination thereof, or other programmable logic device, discrete gate or transistor logic, discrete hardware components, or any combination thereof designed to perform the functions described in the present disclosure, and/or the like. For example, the processor manager 135 may process data (e.g., image data, video data, audio data) or data executable instructions from and/or write data or data executable instructions to a local memory of the device 105 or to the database 115.

A device 105 implementing the processor manager 135 may assign a set of executable instructions to an instruction packet based on a parameter associated with the instruction packet, and each executable instruction of the set of executable instructions may be independent from other executable instructions of the set of executable instructions. The device 105 implementing the processor manager 135 may select an order of the set of executable instructions based on a slot instruction rule associated with the device, and each executable instruction of the set of executable instructions may correspond to a respective slot associated with memory of the device 105.

The device 105 implementing the processor manager 135 may modify the order of the set of executable instructions in a memory hierarchy post pre-decode based on the slot instruction rule and process the set of executable instructions of the instruction packet based on the modified order. The techniques described herein may reduce or eliminate code reuse attacks and improve device security. Furthermore, the techniques described herein may provide benefits and enhancements to the operation of the devices 105. For example, by perturbing instructions based on partial instruction precoding, the operational characteristics, such as power consumption and operational runtime of the devices 105 may be reduced.

In the example of FIG. 1, the device 105 may include a system memory including instructions, and the instructions may be loaded into local memory (e.g., a cache) of a processor of the device 105. In some cases, a compiler may generate an instruction packet that contains a set of executable instructions that are partially or fully independent from other executable instructions in the packet. In some examples, the processor architecture may be associated with an instruction length of four instructions, and the processor may execute four instructions per clock cycle. In some examples, the instruction length may be fixed (e.g., four instructions), while in some other examples, the instruction length may be variable (e.g., up to four instructions). Processing multiple instructions per clock cycle may support a compact representation of code while also providing parallelized performance.

A set of executable instructions may be perturbed based on a precoding step. For example, the instruction perturbation may occur as the L1 cache fill occurs, and the perturbation may be random of pseudo random for each instruction packet. A hardware random number generator may be used to randomly choose between valid permutations as determined by the precoder for every instruction packet as the L1 cache is filled. An address space layout randomization technique is an approach that leverages a program loader to randomize the location of the code segment in virtual memory where the program is loaded. This technique may also change the location of code fragments (e.g., code gadgets) by shifting the code segment during loading.

An attacker may attempt to exploit address space layout randomization techniques by predicting or deducing the address of one functions at runtime and reconstructing addresses for other code gadgets in the program. The techniques described herein thwart such an exploitation, since the predicted addresses of the functions will not account for the instruction perturbation. Further, since the perturbation occurs at runtime (as opposed to load time) and keeps occurring on each L1 fill, the attacker is not able to accurately predict when or how the code is perturbed. Additionally, since the executable instructions corresponding to instruction packets may perturb code gadgets independently, the attacker would need to correctly guess the code permutation for every gadget in a desired sequence of code gadgets to achieve a desired state. In some cases, an attacker may attempt a brute force or address space exploration attack. The technique described increase the number of different potential permutations of code gadgets for the desired sequence at runtime, thereby reducing the risk of both brute force and address space exploration attacks.

The server 110 may be a data server, a cloud server, a server associated with a subscription provider, proxy server, web server, application server, communications server, home server, mobile server, or any combination thereof. The server 110 may in some cases include a distribution platform 140. The distribution platform 140 may allow the devices 105 to discover, browse, share, and download data via network 120 using communications links 125, and therefore provide a digital distribution of data from the distribution platform 140. As such, a digital distribution may be a form of delivering media content such as audio, video, images, without the use of physical media but over online delivery mediums, such as the Internet. For example, the devices 105 may upload or download applications for streaming, downloading, uploading, processing, enhancing, etc. data (e.g., images, audio, video). The server 110 may also transmit to the devices 105 a variety of information, such as instructions or commands to download applications on the device 105.

The database 115 may store a variety of information, such as instructions or commands. For example, the database 115 may store data or data executable instructions. The device may support techniques for instruction perturbation for improved device security associated with the data. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet. The communications links 125 shown in the system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
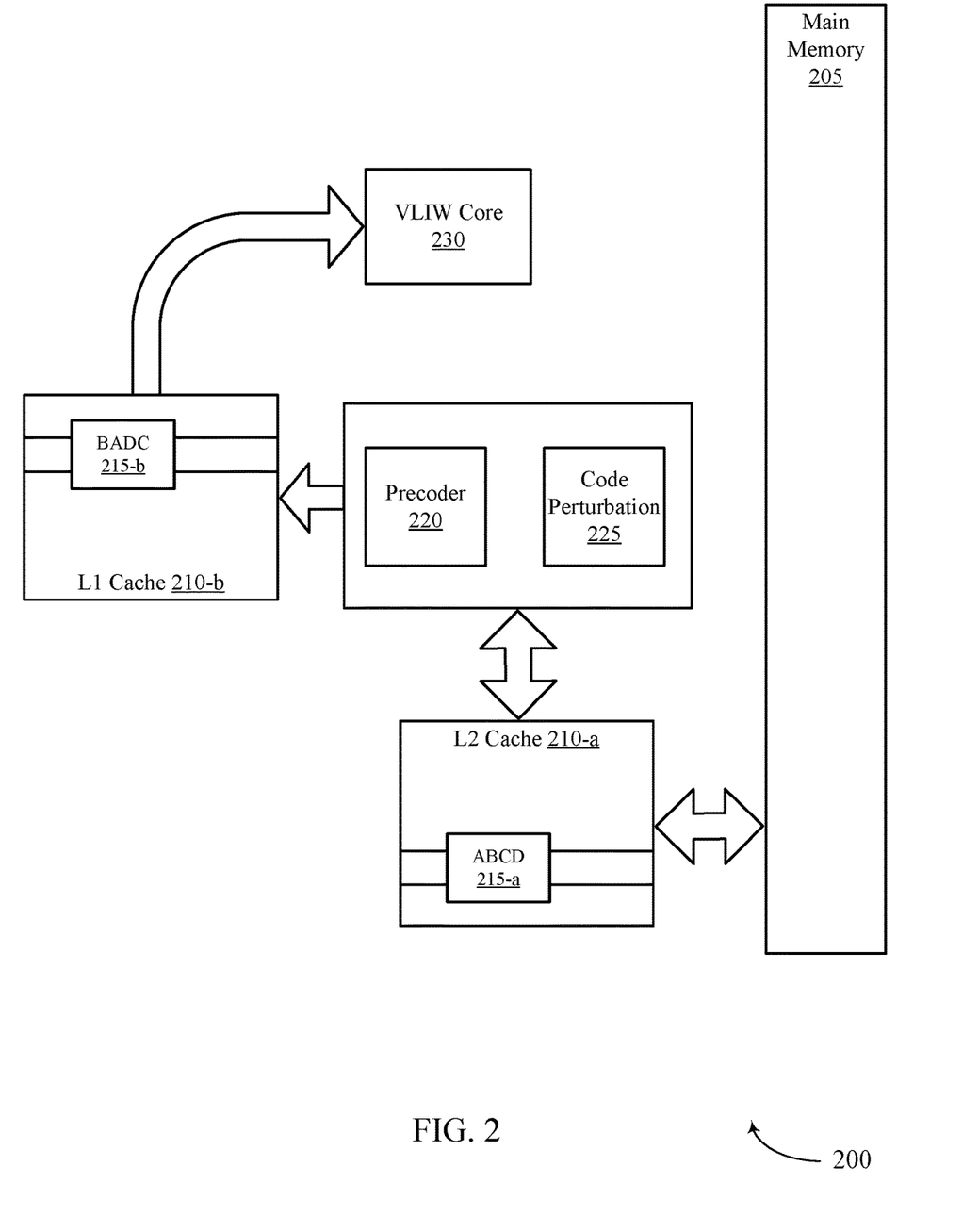
FIG. 2 illustrates an example of an instruction processing technique that supports techniques for instruction perturbation for improved device security in accordance with aspects of the present disclosure.

FIG. 2 illustrates an example of an instruction processing technique 200 that supports techniques for instruction perturbation for improved device security in accordance with aspects of the present disclosure. The instruction processing technique 200 may implement aspects of the system 100. For example, a processor core 230 (e.g., a VLIW core) may support the instruction processing technique 200 and may process executable instructions, and the executable instructions may be processed based on the code perturbation 225. A processor (e.g., a VLIW processor, a Hexagon processor, a CPU, a GPU, a DSP, etc.) may include one or more aspects of the instruction processing technique 200. For example, the processor may load instructions from the main memory 205 into L2 cache 210-a according to instruction order 215-a, apply a precoder at 220, perturbate the instructions at 225, load the instructions into L1 cache 210-b according to instruction order 215-b, and process the instructions at the processor core 230.

The processor core 230 may process a set of executable instructions of an instruction packet based on a modified or perturbed order of the set of executable instructions. As an illustrative example, an instruction packet may be loaded into L2 cache 210-a, and the instruction packet may contain the instructions A, B, C, and D (which may represent instructions such as load, store, shift, push, pop, return, etc.). Continuing with the illustrative example, L2 cache 210-a may use memory addresses (e.g., virtual memory addresses, slots, etc.) to represent the executable instructions of the instruction packet. The memory addresses may be considered a first order of the set of executable instructions, which may be represented as instruction order 215-a.

At 220, a precoder may apply a partially or fully decode the instructions of the set of executable instructions, and the first order of the set of executable instructions (e.g., instruction order 215-a) may be modified (e.g., perturbed, shuffled, etc.) into a second order of the set of executable instructions (e.g., instruction order 215-b) based on perturbing the instructions at 220. In some cases, modifying the first order into the second order may not introduce any dependencies among instructions. In some cases, the instructions may be perturbed based on one or more slot instruction rules.

For example, processors, devices, or architectures may be associated with rules (e.g., constraints) indicating valid slots for different types of instructions. In some cases, the instructions may be modified at random (e.g., based on a pseudo random number generator), and the modified order of the instructions may be validated such that slot rules are satisfied. Modifying the order of the set of instructions may thwart code reuse attacks and improve device security, as an attacker may fail to predict the location of different instructions, and therefore lose the ability to reuse particular instructions (e.g., code gadgets). Thus, randomization may be used to shuffle the order of instructions within a packet in the memory hierarchy as described herein. An attack is thereby thwarted because the set of instructions that an attacker expects to execute are not executed.

Some VLIW architectures enforce constraints on which classes of instructions can be placed in which slots. For instance, a branch instruction may have to be either in slot 3 or 4. ALU instructions may go in slots 1 through 4 except when there are load instructions or store instructions, or both, in the instruction packet, etc. That is, in some cases, not all 16 permutations of [A, B, C, D] are available. Some pre-decoder fetch instructions through the memory hierarchy. This stage performs a partial decode of instruction packets to speed up execution in the core, which may include inserting code perturbations that also permutes the virtual address of these instructions.

Accordingly, code perturbation occurs on every L1 cache fill and it happens randomly for every instruction packet. All the packets in all the cache lines in L1 are all perturbed and most code gadgets keep changing their location. A hardware random number generator may be used to randomly choose between legal permutations as determined by the pre-decoder for every instruction packet as it fills the L1 cache. Because the instructions operate on a cache line at a time and sit between the L1 and L2 levels, the code perturbation provides improvements to reduced overhead to execution.

Figure 3:
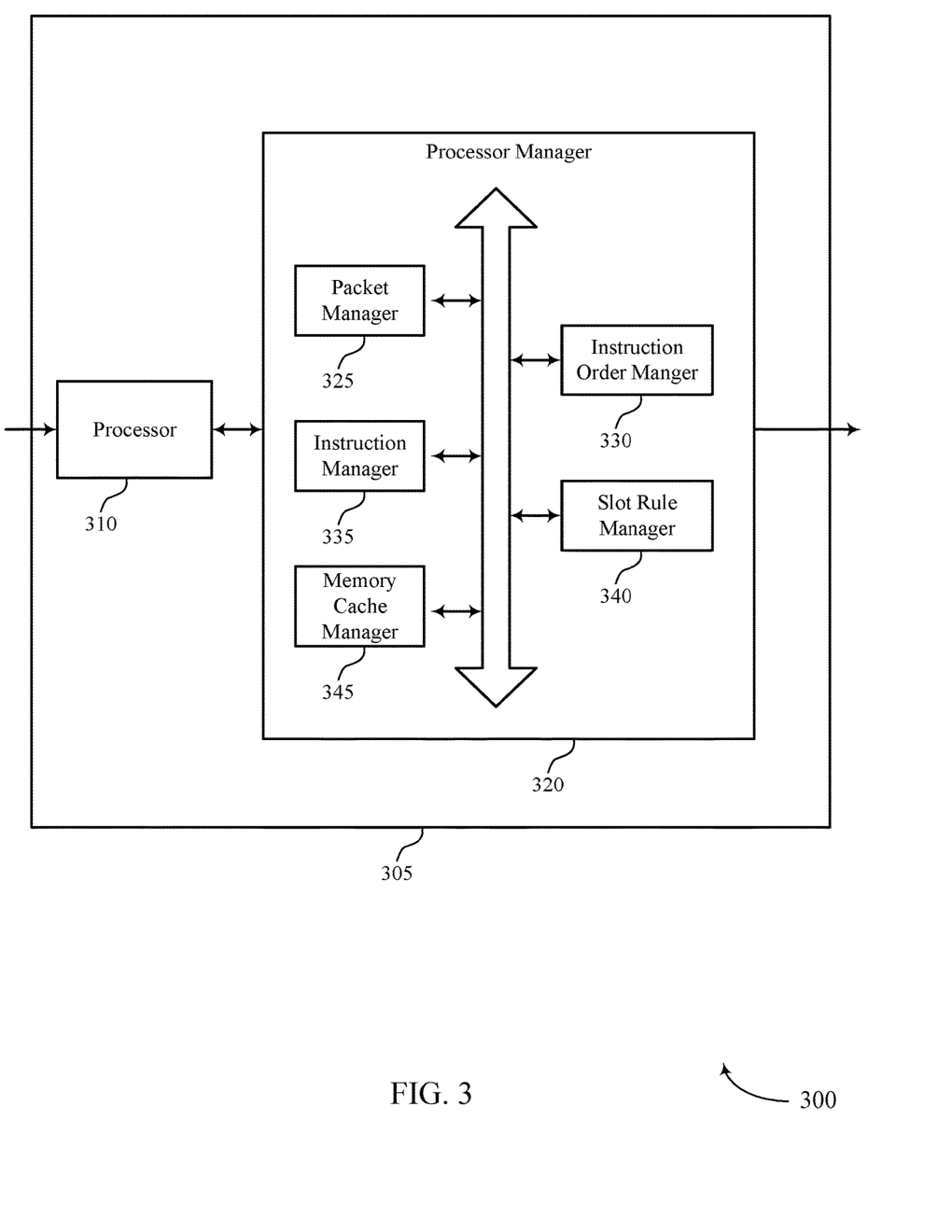
FIG. 3 shows a block diagram of a device that supports techniques for instruction perturbation for improved device security in accordance with aspects of the present disclosure.

FIG. 3 shows a block diagram 300 of a device 305 that supports techniques for instruction perturbation for improved device security in accordance with aspects of the present disclosure. The device 305 may be an example of aspects of a processor as described herein. The device 305 may include a processor 310 and a processor manager 320. Each of these components may be in communication with one another (e.g., via one or more buses).

The processor 310 may execute one or more software applications, such as web browsers, graphical user interfaces, video games, or other applications involving graphics rendering for image depiction. As described herein, processor 310 may encounter a processor manager program (e.g., a program suited for handling by processor manager 320) when executing the one or more software applications. Accordingly, processor 310 may submit rendering commands to processor manager 320 (e.g., via a processor manager driver containing a compiler for parsing API-based commands).

The processor manager 320, the processor 310, or various combinations thereof or various components thereof may be examples of means for performing various aspects of techniques for instruction perturbation for improved device security as described herein. For example, the processor manager 320, the processor 310, or various combinations or components thereof may support a method for performing one or more of the functions described herein.

In some examples, the processor manager 320, the processor 310, or various combinations or components thereof may be implemented in hardware (e.g., in communications management circuitry). The hardware may include a processor, a DSP, an ASIC, an FPGA, a VLIW processor, or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the processor manager 320, the processor 310, or various combinations or components thereof may be implemented in code (e.g., as communications management software or firmware) executed by a processor. If implemented in code executed by a processor, the functions of the processor manager 320, the processor 310, or various combinations or components thereof may be performed by a general-purpose processor, a DSP, a processor, an ASIC, an FPGA, a VLIW processor, or any combination of these or other programmable logic devices (e.g., configured as or otherwise supporting a means for performing the functions described in the present disclosure).

In some examples, the processor manager 320 may be configured to perform various operations (e.g., receiving, monitoring, transmitting) using or otherwise in cooperation with the processor 310. For example, the processor manager 320 may receive information from the processor 310 or be integrated in combination with the processor 310 to receive information, transmit information, or perform various other operations as described herein.

For example, the processor manager 320 may be configured as or otherwise support a means for assigning a set of executable instructions to an instruction packet based on a parameter associated with the instruction packet, each executable instruction of the set of executable instructions independent from other executable instructions of the set of executable instructions. The processor manager 320 may be configured as or otherwise support a means for selecting an order of the set of executable instructions based on a slot instruction rule associated with the device, each executable instruction of the set of executable instructions corresponding to a respective slot associated with a memory of the device. The processor manager 320 may be configured as or otherwise support a means for modifying the order of the set of executable instructions in a memory hierarchy post pre-decode based on the slot instruction rule. The processor manager 320 may be configured as or otherwise support a means for processing the set of executable instructions of the instruction packet based on the modified order. By including or configuring the processor manager 320 in accordance with examples as described herein, the device 305 (e.g., a processor controlling or otherwise coupled to the processor 310, the processor manager 320, or a combination thereof) may support techniques for securely processing multiple instructions in parallel and efficient resource utilization.

The device 305, or various components thereof, may be an example of means for performing various aspects of techniques for instruction perturbation for improved device security as described herein. For example, the processor manager 320 may include a packet manager 325, an instruction order manger 330, an instruction manager 335, a slot rule manager 340, a memory cache manager 345, or any combination thereof. Each of these components may communicate, directly or indirectly, with one another (e.g., via one or more buses).

The packet manager 325 may be configured as or otherwise support a means for assigning a set of executable instructions to an instruction packet based on a parameter associated with the instruction packet, each executable instruction of the set of executable instructions independent from other executable instructions of the set of executable instructions. The instruction order manger 330 may be configured as or otherwise support a means for selecting an order of the set of executable instructions based on a slot instruction rule associated with the device, each executable instruction of the set of executable instructions corresponding to a respective slot associated with a memory of the device. In some examples, the instruction order manger 330 may be configured as or otherwise support a means for modifying the order of the set of executable instructions in a memory hierarchy post pre-decode based on the slot instruction rule. The instruction manager 335 may be configured as or otherwise support a means for processing the set of executable instructions of the instruction packet based on the modified order.

In some examples, the packet manager 325 may be configured as or otherwise support a means for selecting a packet size of the instruction packet based on the set of executable instructions. In some examples, the packet manager 325 may be configured as or otherwise support a means for assigning the set of executable instructions to the instructions packet based on the selected packet size of the instruction packet. In some examples, to support modifying the order of the set of executable instructions, the instruction order manger 330 may be configured as or otherwise support a means for selecting a first order of the set of executable instructions. In some examples, to support modifying the order of the set of executable instructions, the slot rule manager 340 may be configured as or otherwise support a means for determining, based on the first order of the set of executable instructions, that at least one executable instruction of the set of executable instructions violates the slot instruction rule. In some examples, to support modifying the order of the set of executable instructions, the instruction manager 335 may be configured as or otherwise support a means for in response to the at least one executable instruction of the set of executable instructions violating the slot instruction rule, refraining from processing the set of executable instructions of the instruction packet based on the first order.

In some examples, the instruction order manger 330 may be configured as or otherwise support a means for selecting a second order of the set of executable instructions based on determining that the at least one executable instruction of the set of executable instructions violates the slot instruction rule. In some examples, the slot rule manager 340 may be configured as or otherwise support a means for determining based on the second order of the set of executable instructions, that each executable instruction of the set of executable instructions satisfies the slot instruction rule. In some examples, the instruction manager 335 may be configured as or otherwise support a means for in response to each executable instruction of the set of executable instructions satisfying the slot instruction rule, processing the set of executable instructions of the instruction packet based on the second order.

The slot rule manager 340 may be configured as or otherwise support a means for determining that each executable instruction of the set of executable instructions corresponds to a valid respective slot associated with the memory of the device. In some examples, the instruction order manger 330 may be configured as or otherwise support a means for where selecting the order for the set of executable instructions is based on determining that each executable instruction of the set of executable instructions corresponds to the valid respective slot associated with the memory of the device. In some examples, the memory cache manager 345 may be configured as or otherwise support a means for receiving, from a first memory cache associated with the device, the set of executable instructions based on an initial order. In some examples, the memory cache manager 345 may be configured as or otherwise support a means for transmitting, to a second memory cache associated with the device, the set of executable instructions based on the modified order.

The instruction manager 335 may be configured as or otherwise support a means for processing a subset of executable instructions of the set of executable instructions based on a randomization parameter. In some examples, the instruction manager 335 may be configured as or otherwise support a means for terminating the processing of the subset of executable instructions of the set of executable instructions based on a randomization parameter. In some examples, to support processing the set of executable instructions, the instruction manager 335 may be configured as or otherwise support a means for executing the set of executable instructions on one or more processors associated with the device. In some examples, the one or more processors (e.g., the processor 310) include a variable length processor, a very long instruction word processor, or a Hexagon processor, or a combination thereof. In some examples, the slot instruction rule includes an indication of one or more instruction types that are supported by a slot. In some examples, the parameter includes a packet size parameter identifying a packet size of the instruction packet. In some examples, the set of executable instructions includes an absence of interlocked pipelined stages instructions. In some examples, the set of executable instructions includes fewer executable instructions than a threshold number of executable instructions per instruction packet.

Figure 4:
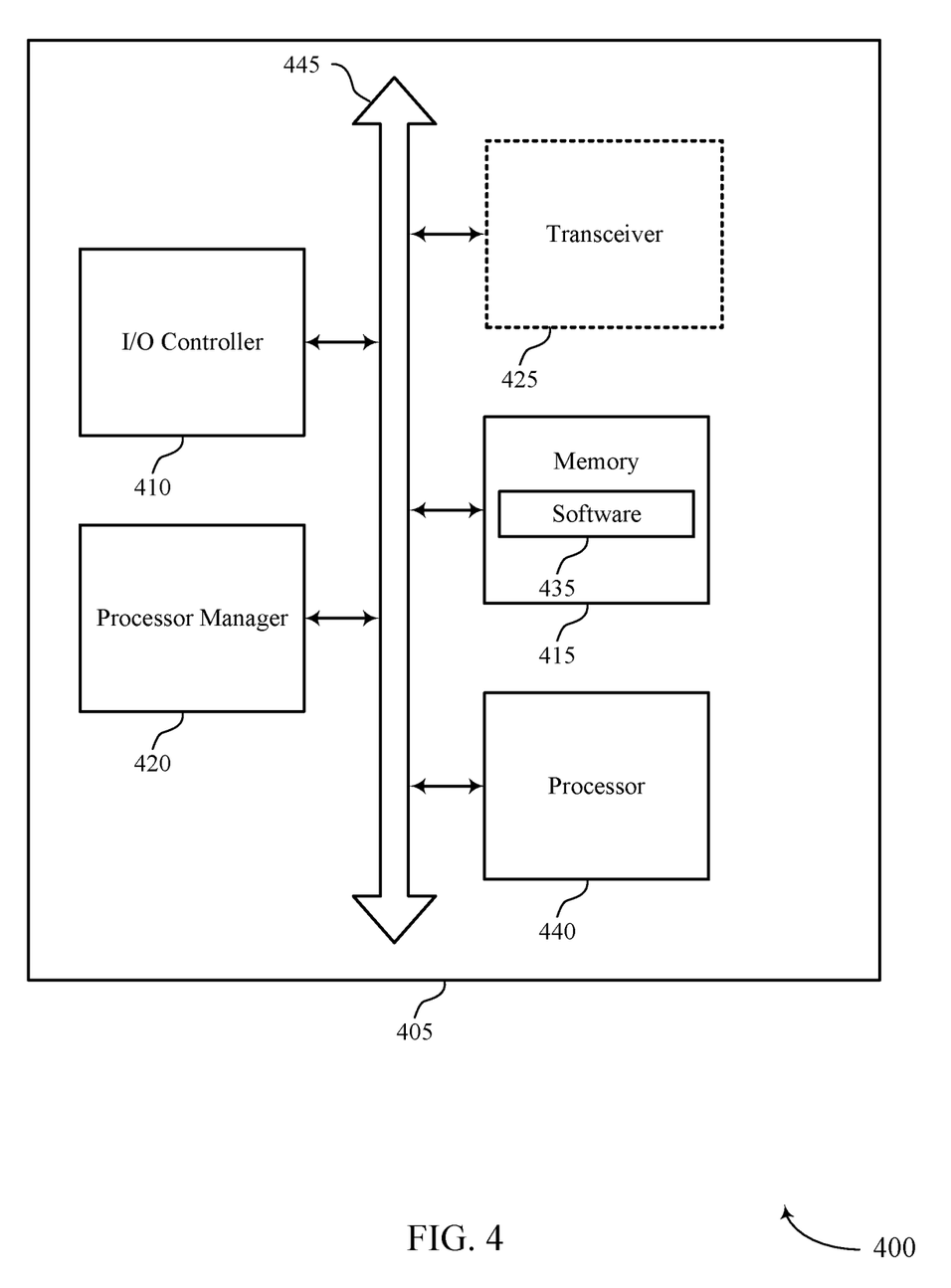
FIG. 4 shows a diagram of a system including a device that supports techniques for instruction perturbation for improved device security in accordance with aspects of the present disclosure.

FIG. 4 shows a diagram of a system 400 including a device 405 that supports techniques for instruction perturbation for improved device security in accordance with aspects of the present disclosure. The device 405 may be an example of or include the components of a device 305 as described herein. The device 405 may include components for bi-directional voice and data communications including components for transmitting and receiving communications, such as a processor manager 420, an I/O controller 410, a memory 415, a transceiver 425, and a processor 440. These components may be in electronic communication or otherwise coupled (e.g., operatively, communicatively, functionally, electronically, electrically) via one or more buses (e.g., a bus 435).

The I/O controller 410 may manage input and output signals for the device 405. The I/O controller 410 may also manage peripherals not integrated into the device 405. In some cases, the I/O controller 410 may represent a physical connection or port to an external peripheral. In some cases, the I/O controller 410 may utilize an operating system such as iOS®, ANDROID®, MS-DOS®, MS-WINDOWS®, OS/2®, UNIX®, LINUX®, or another known operating system. In some other cases, the I/O controller 410 may represent or interact with a modem, a keyboard, a mouse, a touchscreen, or a similar device. In some cases, the I/O controller 410 may be implemented as part of a processor, such as the processor 440. In some cases, a user may interact with the device 405 via the I/O controller 410 or via hardware components controlled by the I/O controller 410.

The memory 415 may include RAM and ROM. The memory 415 may store software 435 (e.g., computer-readable code, computer-executable code) including instructions that, when executed by the processor manager 420 or the processor 440, cause the device 405 to perform various functions described herein. The software 435 may be stored in a non-transitory computer-readable medium such as system memory or other type of memory. In some cases, the software 435 may not be directly executable by the processor manager 420 or the processor 440 but may cause a computer (e.g., when compiled and executed) to perform functions described herein. In some cases, the memory 415 may contain, among other things, a BIOS which may control basic hardware or software operation such as the interaction with peripheral components or devices.

In some cases, the device 405 may include a single antenna. However, in some other cases the device 405 may have more than one antenna, which may be capable of concurrently transmitting or receiving multiple wireless transmissions. The transceiver 425 may communicate bi-directionally, via the one or more antennas, wired, or wireless links as described herein. For example, the transceiver 425 may represent a wireless transceiver and may communicate bi-directionally with another wireless transceiver. The transceiver 425 may also include a modem to modulate the packets and provide the modulated packets to one or more antennas for transmission, and to demodulate packets received from the one or more antennas. The transceiver 425, or the transceiver 425 and one or more antennas, may be an example of a transmitter, a receiver, or any combination thereof or component thereof, as described herein.

The software 435 may include instructions to implement aspects of the present disclosure, including instructions to support wireless communications. The software 435 may be stored in a non-transitory computer-readable medium such as system memory or other type of memory. In some cases, the software 435 may not be directly executable by the processor 440 but may cause a computer (e.g., when compiled and executed) to perform functions described herein.

For example, the processor manager 420 may be configured as or otherwise support a means for assigning a set of executable instructions to an instruction packet based on a parameter associated with the instruction packet, each executable instruction of the set of executable instructions independent from other executable instructions of the set of executable instructions. The processor manager 420 may be configured as or otherwise support a means for selecting an order of the set of executable instructions based on a slot instruction rule associated with the device, each executable instruction of the set of executable instructions corresponding to a respective slot associated with a memory of the device. The processor manager 420 may be configured as or otherwise support a means for modifying the order of the set of executable instructions in a memory hierarchy post pre-decode based on the slot instruction rule. The processor manager 420 may be configured as or otherwise support a means for processing the set of executable instructions of the instruction packet based on the modified order. By including or configuring the processor manager 420 in accordance with examples as described herein, the device 405 may support techniques for reduced instruction processing time, more efficient utilization of communication resources, and improved device security.

The processor manager 420, or its sub-components, may be implemented in hardware, code (e.g., software or firmware) executed by a processor, or any combination thereof. If implemented in code executed by a processor, the functions of the processor manager 420, or its sub-components may be executed by a general-purpose processor, a DSP, an ASIC, an FPGA or other programmable logic device, discrete gate or transistor logic, discrete hardware components, or any combination thereof designed to perform the functions described in the present disclosure. The processor manager 420, or its sub-components, may be physically located at various positions, including being distributed such that portions of functions are implemented at different physical locations by one or more physical components. In some examples, the processor manager 420, or its sub-components, may be a separate and distinct component in accordance with various aspects of the present disclosure. In some examples, the processor manager 420, or its subcomponents, may be combined with one or more other hardware components, including but not limited to an I/O component, a transceiver, a network server, another computing device, one or more other components described in the present disclosure, or a combination thereof in accordance with various aspects of the present disclosure.

Figure 5:
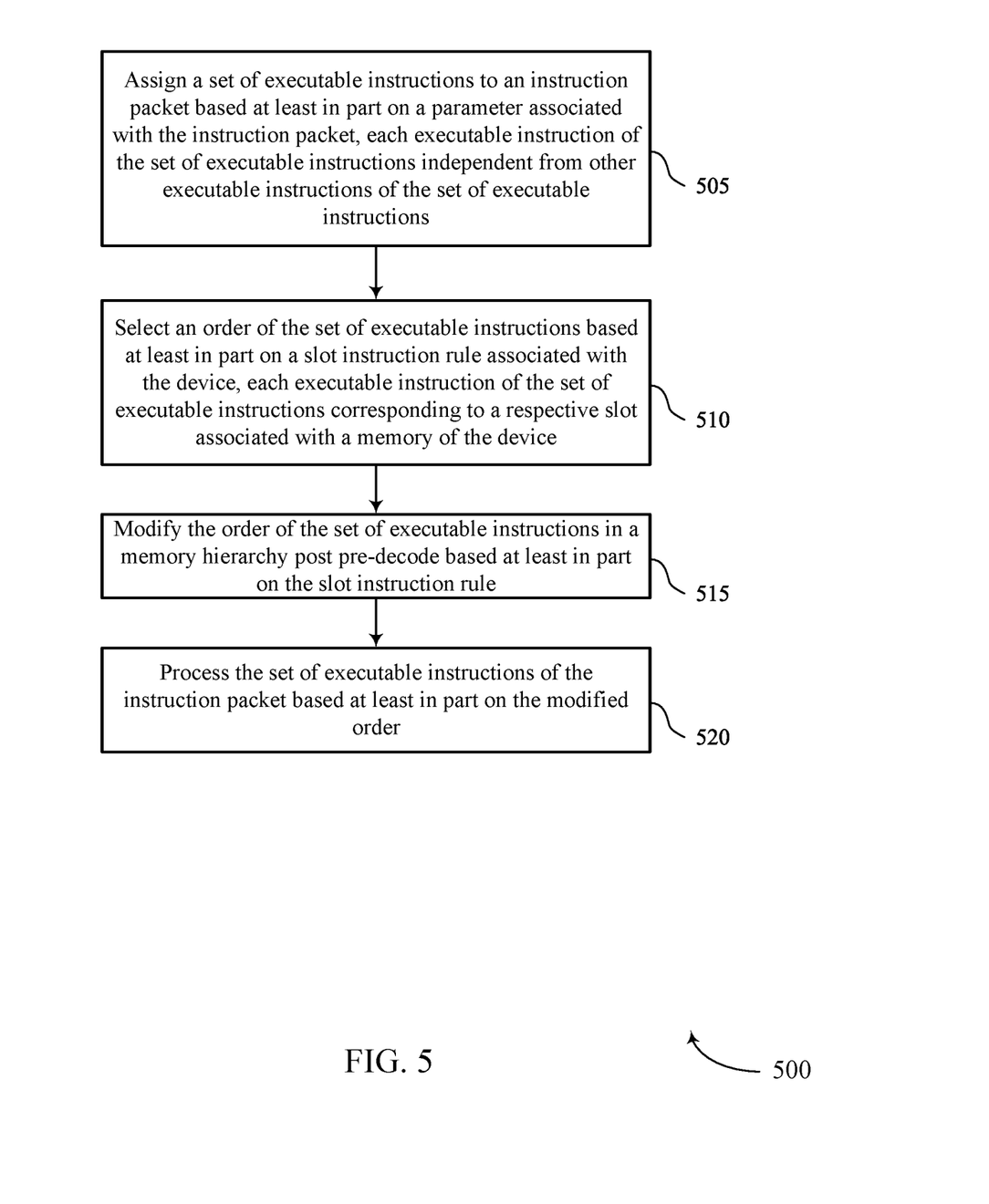
FIGS. 5 through 7 show flowcharts illustrating methods that support techniques for instruction perturbation for improved device security in accordance with aspects of the present disclosure.

FIG. 5 shows a flowchart illustrating a method 500 that supports techniques for instruction perturbation for improved device security in accordance with aspects of the present disclosure. The operations of the method 500 may be implemented by a processor manager device or its components as described herein. For example, the operations of the method 500 may be performed by a processor manager device as described with reference to FIGS. 1 through 4. In some examples, a processor manager device may execute a set of instructions to control the functional elements of the processor manager device to perform the described functions. Additionally or alternatively, the processor manager device may perform aspects of the described functions using special-purpose hardware.

At 505, the method may include assigning a set of executable instructions to an instruction packet based on a parameter associated with the instruction packet, each executable instruction of the set of executable instructions independent from other executable instructions of the set of executable instructions. The operations of 505 may be performed in accordance with examples as disclosed herein. In some examples, aspects of the operations of 505 may be performed by a packet manager 325 as described with reference to FIG. 3.

At 510, the method may include selecting an order of the set of executable instructions based on a slot instruction rule associated with the device, each executable instruction of the set of executable instructions corresponding to a respective slot associated with a memory of the device. The operations of 510 may be performed in accordance with examples as disclosed herein. In some examples, aspects of the operations of 510 may be performed by an instruction order manger 330 as described with reference to FIG. 3.

At 515, the method may include modifying the order of the set of executable instructions in a memory hierarchy post pre-decode based on the slot instruction rule. The operations of 515 may be performed in accordance with examples as disclosed herein. In some examples, aspects of the operations of 515 may be performed by an instruction order manger 330 as described with reference to FIG. 3.

At 520, the method may include processing the set of executable instructions of the instruction packet based on the modified order. The operations of 520 may be performed in accordance with examples as disclosed herein. In some examples, aspects of the operations of 520 may be performed by an instruction manager 335 as described with reference to FIG. 3.

Figure 6:
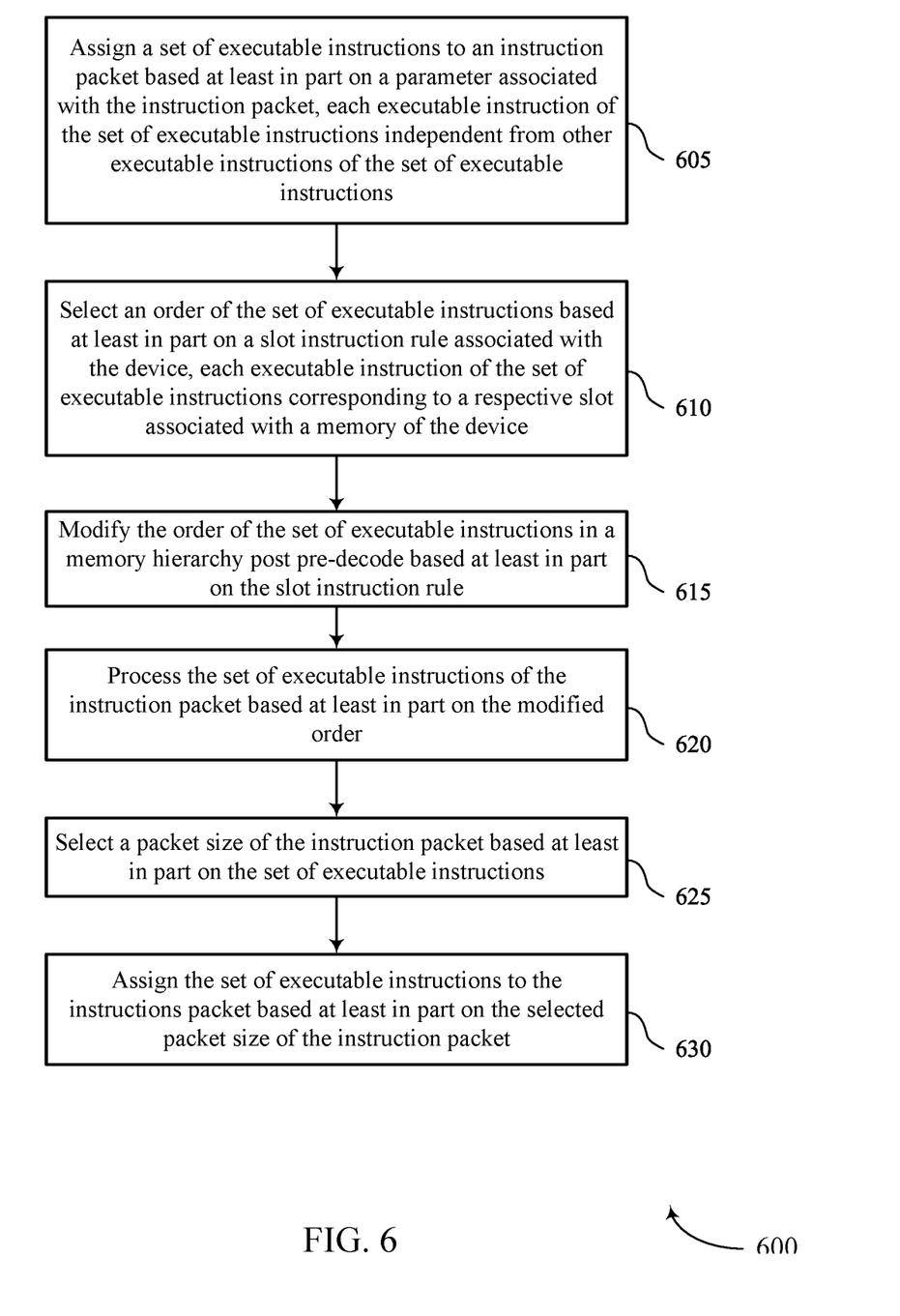

FIG. 6 shows a flowchart illustrating a method 600 that supports techniques for instruction perturbation for improved device security in accordance with aspects of the present disclosure. The operations of the method 600 may be implemented by a processor manager device or its components as described herein. For example, the operations of the method 600 may be performed by a processor manager device as described with reference to FIGS. 1 through 4. In some examples, a processor manager device may execute a set of instructions to control the functional elements of the processor manager device to perform the described functions. Additionally or alternatively, the processor manager device may perform aspects of the described functions using special-purpose hardware.

At 605, the method may include assigning a set of executable instructions to an instruction packet based on a parameter associated with the instruction packet, each executable instruction of the set of executable instructions independent from other executable instructions of the set of executable instructions. The operations of 605 may be performed in accordance with examples as disclosed herein. In some examples, aspects of the operations of 605 may be performed by a packet manager 325 as described with reference to FIG. 3.

At 610, the method may include selecting an order of the set of executable instructions based on a slot instruction rule associated with the device, each executable instruction of the set of executable instructions corresponding to a respective slot associated with a memory of the device. The operations of 610 may be performed in accordance with examples as disclosed herein. In some examples, aspects of the operations of 610 may be performed by an instruction order manger 330 as described with reference to FIG. 3.

At 615, the method may include modifying the order of the set of executable instructions in a memory hierarchy post pre-decode based on the slot instruction rule. The operations of 615 may be performed in accordance with examples as disclosed herein. In some examples, aspects of the operations of 615 may be performed by an instruction order manger 330 as described with reference to FIG. 3.

At 620, the method may include processing the set of executable instructions of the instruction packet based on the modified order. The operations of 620 may be performed in accordance with examples as disclosed herein. In some examples, aspects of the operations of 620 may be performed by an instruction manager 335 as described with reference to FIG. 3.

At 625, the method may include selecting a packet size of the instruction packet based on the set of executable instructions. The operations of 625 may be performed in accordance with examples as disclosed herein. In some examples, aspects of the operations of 625 may be performed by a packet manager 325 as described with reference to FIG. 3.

At 630, the method may include assigning the set of executable instructions to the instructions packet based on the selected packet size of the instruction packet. The operations of 630 may be performed in accordance with examples as disclosed herein. In some examples, aspects of the operations of 630 may be performed by a packet manager 325 as described with reference to FIG. 3.

Figure 7:
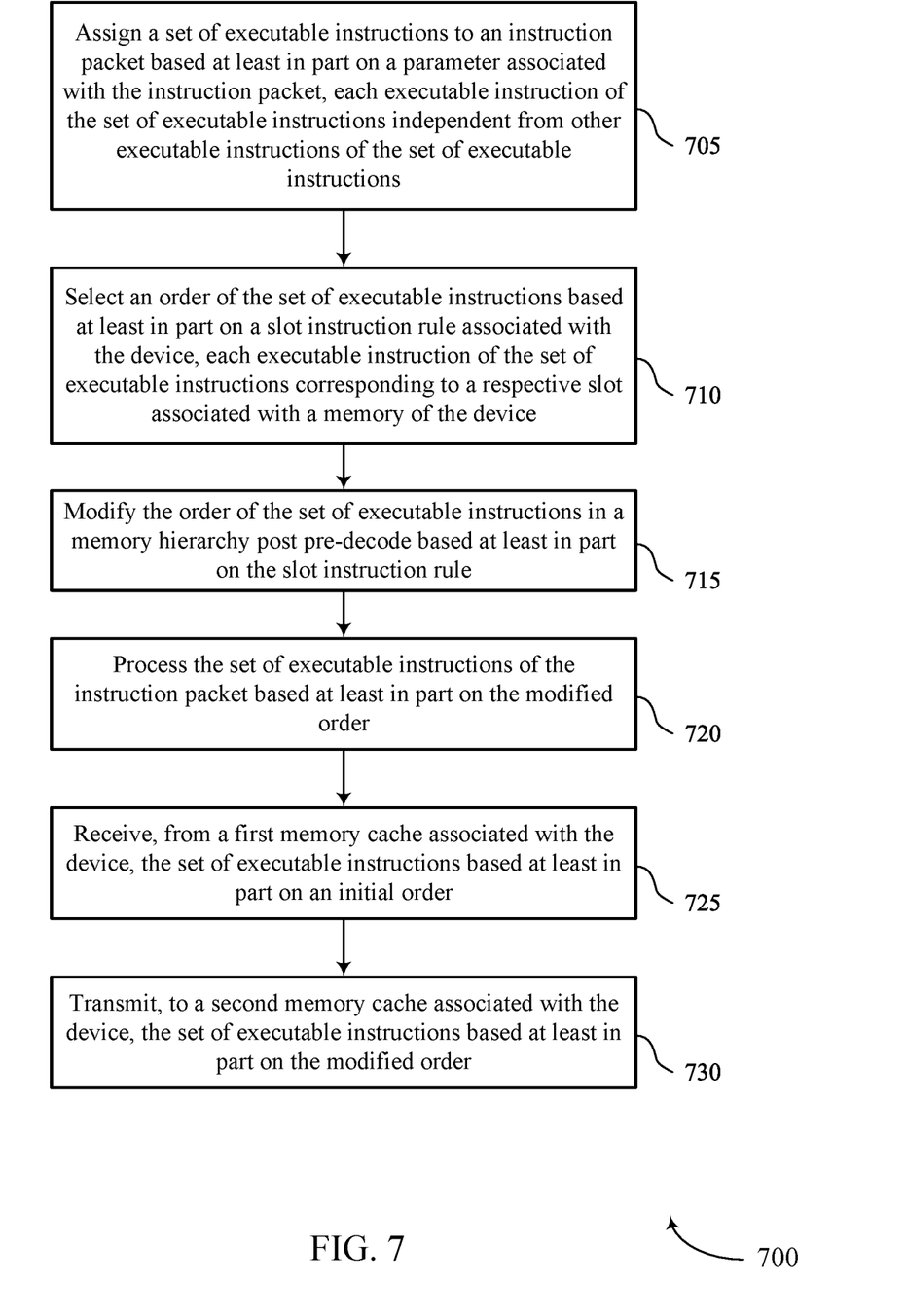

FIG. 7 shows a flowchart illustrating a method 700 that supports techniques for instruction perturbation for improved device security in accordance with aspects of the present disclosure. The operations of the method 700 may be implemented by a processor manager device or its components as described herein. For example, the operations of the method 700 may be performed by a processor manager device as described with reference to FIGS. 1 through 4. In some examples, a processor manager device may execute a set of instructions to control the functional elements of the processor manager device to perform the described functions. Additionally or alternatively, the processor manager device may perform aspects of the described functions using special-purpose hardware.

At 705, the method may include assigning a set of executable instructions to an instruction packet based on a parameter associated with the instruction packet, each executable instruction of the set of executable instructions independent from other executable instructions of the set of executable instructions. The operations of 705 may be performed in accordance with examples as disclosed herein. In some examples, aspects of the operations of 705 may be performed by a packet manager 325 as described with reference to FIG. 3.

At 710, the method may include selecting an order of the set of executable instructions based on a slot instruction rule associated with the device, each executable instruction of the set of executable instructions corresponding to a respective slot associated with a memory of the device. The operations of 710 may be performed in accordance with examples as disclosed herein. In some examples, aspects of the operations of 710 may be performed by an instruction order manger 330 as described with reference to FIG. 3.

At 715, the method may include modifying the order of the set of executable instructions in a memory hierarchy post pre-decode based on the slot instruction rule. The operations of 715 may be performed in accordance with examples as disclosed herein. In some examples, aspects of the operations of 715 may be performed by an instruction order manger 330 as described with reference to FIG. 3.

At 720, the method may include processing the set of executable instructions of the instruction packet based on the modified order. The operations of 720 may be performed in accordance with examples as disclosed herein. In some examples, aspects of the operations of 720 may be performed by an instruction manager 335 as described with reference to FIG. 3.

At 725, the method may include receiving, from a first memory cache associated with the device, the set of executable instructions based on an initial order. The operations of 725 may be performed in accordance with examples as disclosed herein. In some examples, aspects of the operations of 725 may be performed by a memory cache manager 345 as described with reference to FIG. 3.

At 730, the method may include transmitting, to a second memory cache associated with the device, the set of executable instructions based on the modified order. The operations of 730 may be performed in accordance with examples as disclosed herein. In some examples, aspects of the operations of 730 may be performed by a memory cache manager 345 as described with reference to FIG. 3.

It should be noted that the methods described herein describe possible implementations, and that the operations and the steps may be rearranged or otherwise modified and that other implementations are possible. Further, aspects from two or more of the methods may be combined.

Aspect 1: A method at a device, comprising: assigning a set of executable instructions to an instruction packet based at least in part on a parameter associated with the instruction packet, each executable instruction of the set of executable instructions independent from other executable instructions of the set of executable instructions; selecting an order of the set of executable instructions based at least in part on a slot instruction rule associated with the device, each executable instruction of the set of executable instructions corresponding to a respective slot associated with a memory of the device; modifying the order of the set of executable instructions in a memory hierarchy post pre-decode based at least in part on the slot instruction rule; and processing the set of executable instructions of the instruction packet based at least in part on the modified order.

Aspect 2: The method of aspect 1, further comprising: selecting a packet size of the instruction packet based at least in part on the set of executable instructions; and assigning the set of executable instructions to the instructions packet based at least in part on the selected packet size of the instruction packet.

Aspect 3: The method of any of aspects 1 through 2, wherein modifying the order of the set of executable instructions comprises: selecting a first order of the set of executable instructions; determining, based at least in part on the first order of the set of executable instructions, that at least one executable instruction of the set of executable instructions violates the slot instruction rule; and in response to the at least one executable instruction of the set of executable instructions violating the slot instruction rule, refraining from processing the set of executable instructions of the instruction packet based at least in part on the first order.

Aspect 4: The method of aspect 3, further comprising: selecting a second order of the set of executable instructions based at least in part on determining that the at least one executable instruction of the set of executable instructions violates the slot instruction rule; determining based at least in part on the second order of the set of executable instructions, that each executable instruction of the set of executable instructions satisfies the slot instruction rule; and in response to each executable instruction of the set of executable instructions satisfying the slot instruction rule, processing the set of executable instructions of the instruction packet based at least in part on the second order.

Aspect 5: The method of any of aspects 1 through 4, further comprising: determining that each executable instruction of the set of executable instructions corresponds to a valid respective slot associated with the memory of the device, wherein selecting the order for the set of executable instructions is based at least in part on determining that each executable instruction of the set of executable instructions corresponds to the valid respective slot associated with the memory of the device.

Aspect 6: The method of any of aspects 1 through 5, further comprising: receiving, from a first memory cache associated with the device, the set of executable instructions based at least in part on an initial order; and transmitting, to a second memory cache associated with the device, the set of executable instructions based at least in part on the modified order.

Aspect 7: The method of any of aspects 1 through 6, further comprising: processing a subset of executable instructions of the set of executable instructions based at least in part on a randomization parameter.

Aspect 8: The method of any of aspects 1 through 7, further comprising: terminating the processing of the subset of executable instructions of the set of executable instructions based at least in part on a randomization parameter.

Aspect 9: The method of any of aspects 1 through 8, wherein processing the set of executable instructions comprises: executing the set of executable instructions on one or more processors associated with the device.

Aspect 10: The method of aspect 9, wherein the one or more processors comprise a variable length processor, a very long instruction word processor, or a Hexagon processor, or a combination thereof.

Aspect 11: The method of any of aspects 1 through 10, wherein the slot instruction rule comprises an indication of one or more instruction types that are supported by a slot.

Aspect 12: The method of any of aspects 1 through 11, wherein the parameter comprises a packet size parameter identifying a packet size of the instruction packet.

Aspect 13: The method of any of aspects 1 through 12, wherein the set of executable instructions comprises an absence of interlocked pipelined stages instructions.

Aspect 14: The method of any of aspects 1 through 13, wherein the set of executable instructions comprises fewer executable instructions than a threshold number of executable instructions per instruction packet.

Aspect 15: An apparatus comprising a processor; memory coupled with the processor; and instructions stored in the memory and executable by the processor to cause the apparatus to perform a method of any of aspects 1 through 14.

Aspect 16: An apparatus comprising at least one means for performing a method of any of aspects 1 through 14.

Aspect 17: A non-transitory computer-readable medium storing code the code comprising instructions executable by a processor to perform a method of any of aspects 1 through 14.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method at a device, comprising:
assigning a set of executable instructions to an instruction packet based at least in part on a parameter associated with the instruction packet, each executable instruction of the set of executable instructions independent from other executable instructions of the set of executable instructions;

selecting an order of the set of executable instructions based at least in part on a slot instruction rule associated with the device, each executable instruction of the set of executable instructions corresponding to a respective slot associated with a memory of the device;

modifying the order of the set of executable instructions in a memory hierarchy post pre-decode based at least in part on the slot instruction rule, the slot instruction rule indicating a class of instruction for each slot associated with the memory of the device, the modified order based at least in part on each of one or more executable instructions of the set of executable instructions corresponding to a respective class of instruction valid for each respective slot, for each of the one or more executable instructions, associated with the memory of the device; and processing the set of executable instructions of the instruction packet based at least in part on the modified order.

2. The method of claim 1, further comprising:
receiving, from a first memory associated with the device, the set of executable instructions based at least in part on an initial order; and
transmitting, to a second memory associated with the device, the set of executable instructions based at least in part on the modified order.

3. The method of claim 1, further comprising:
selecting a packet size of the instruction packet based at least in part on the set of executable instructions; and
assigning the set of executable instructions to the instruction packet based at least in part on the selected packet size of the instruction packet.

4. The method of claim 1, wherein modifying the order of the set of executable instructions comprises:
selecting a first order of the set of executable instructions;
determining, based at least in part on the first order of the set of executable instructions, that at least one executable instruction of the set of executable instructions violates the slot instruction rule; and
in response to the at least one executable instruction of the set of executable instructions violating the slot instruction rule, refraining from processing the set of executable instructions of the instruction packet based at least in part on the first order.

5. The method of claim 4, further comprising:
selecting a second order of the set of executable instructions based at least in part on determining that the at least one executable instruction of the set of executable instructions violates the slot instruction rule;
determining based at least in part on the second order of the set of executable instructions, that each executable instruction of the set of executable instructions satisfies the slot instruction rule; and
in response to each executable instruction of the set of executable instructions satisfying the slot instruction rule, processing the set of executable instructions of the instruction packet based at least in part on the second order.

6. The method of claim 1, further comprising:
determining that each executable instruction of the set of executable instructions corresponds to a valid respective slot associated with the memory of the device,
wherein selecting the order for the set of executable instructions is based at least in part on determining that each executable instruction of the set of executable instructions corresponds to the valid respective slot associated with the memory of the device.

7. The method of claim 1, further comprising:
processing a subset of executable instructions of the set of executable instructions based at least in part on a randomization parameter.

8. The method of claim 1, wherein processing the set of executable instructions comprises:
executing the set of executable instructions on one or more processors associated with the device.

9. The method of claim 8, wherein the one or more processors comprise a variable length processor, or a very long instruction word processor, or a combination thereof.

10. The method of claim 1, wherein the slot instruction rule comprises an indication of one or more instruction types that are supported by a slot.

11. The method of claim 1, wherein the parameter comprises a packet size parameter identifying a packet size of the instruction packet.

12. The method of claim 1, wherein the set of executable instructions comprises an absence of interlocked pipelined stages instructions.

13. The method of claim 1, wherein the set of executable instructions comprises fewer executable instructions than a threshold number of executable instructions per instruction packet.

14. An apparatus, comprising:
a processor;
memory coupled with the processor; and
instructions stored in the memory and executable by the processor to cause the apparatus to:
assign a set of executable instructions to an instruction packet based at least in part on a parameter associated with the instruction packet, each executable instruction of the set of executable instructions independent from other executable instructions of the set of executable instructions;
select an order of the set of executable instructions based at least in part on a slot instruction rule associated with the apparatus, each executable instruction of the set of executable instructions corresponding to a respective slot associated with a memory of the apparatus;
modify the order of the set of executable instructions in a memory hierarchy post pre-decode based at least in part on the slot instruction rule, the slot instruction rule indicating a class of instruction for each slot associated with the memory of the apparatus, the modified order based at least in part on each of one or more executable instructions of the set of executable instructions corresponding to a respective class of instruction valid for each respective slot, for each of the one or more executable instructions, associated with the memory of the apparatus; and
process the set of executable instructions of the instruction packet based at least in part on the modified order.

15. The apparatus of claim 14, wherein the instructions are further executable by the processor to cause the apparatus to:
receive, from a first memory associated with the apparatus, the set of executable instructions based at least in part on an initial order; and
transmit, to a second memory associated with the apparatus, the set of executable instructions based at least in part on the modified order.

16. The apparatus of claim 14, wherein the instructions are further executable by the processor to cause the apparatus to:

select a packet size of the instruction packet based at least in part on the set of executable instructions; and assign the set of executable instructions to the instructions packet based at least in part on the selected packet size of the instruction packet.

17. The apparatus of claim 14, wherein the instructions to modify the order of the set of executable instructions are executable by the processor to cause the apparatus to:

select a first order of the set of executable instructions;

determine, based at least in part on the first order of the set of executable instructions, that at least one executable instruction of the set of executable instructions violates the slot instruction rule; and in response to the at least one executable instruction of the set of executable instructions violate the slot instruction rule, refraining from processing the set of executable instructions of the instruction packet based at least in part on the first order.

18. The apparatus of claim 17, wherein the instructions are further executable by the processor to cause the apparatus to:

select a second order of the set of executable instructions based at least in part on determining that the at least one executable instruction of the set of executable instructions violates the slot instruction rule;

determine based at least in part on the second order of the set of executable instructions, that each executable instruction of the set of executable instructions satisfies the slot instruction rule; and in response to each executable instruction of the set of executable instructions satisfy the slot instruction rule, processing the set of executable instructions of the instruction packet based at least in part on the second order.

19. The apparatus of claim 14, wherein the instructions are further executable by the processor to cause the apparatus to:

determine that each executable instruction of the set of executable instructions corresponds to a valid respective slot associated with the memory of the device apparatus, wherein the instructions to select the order for the set of executable instructions are further executable by the processor to cause the apparatus based at least in part on determining that each executable instruction of the set of executable instructions corresponds to the valid respective slot associated with the memory of the apparatus.

20. An apparatus, comprising:

means for assigning a set of executable instructions to an instruction packet based at least in part on a parameter associated with the instruction packet, each executable instruction of the set of executable instructions independent from other executable instructions of the set of executable instructions;

means for selecting an order of the set of executable instructions based at least in part on a slot instruction rule associated with the apparatus, each executable instruction of the set of executable instructions corresponding to a respective slot associated with a memory of the apparatus;

means for modifying the order of the set of executable instructions in a memory hierarchy post pre-decode based at least in part on the slot instruction rule, the slot instruction rule indicating a class of instruction for each slot associated with the memory of the apparatus, the modified order based at least in part on each of one or more executable instructions of the set of executable instructions corresponding to a respective class of instruction valid for each respective slot, for each of the one or more executable instructions, associated with the memory of the apparatus; and means for processing the set of executable instructions of the instruction packet based at least in part on the modified order.

\* \* \* \* \*